US006206553B1

(12) United States Patent
Boddy et al.

(10) Patent No.: US 6,206,553 B1
(45) Date of Patent: Mar. 27, 2001

(54) SINGLE PIVOT MIRROR WITH SECURITY LIGHT

(75) Inventors: Ian Boddy, Ada; Jeffrey Janowicz, Ann Arbor; Robert Brinchek, Southfield, all of MI (US)

(73) Assignee: Magna Mirror Systems Inc., Alto, MI (US)

( * ) Notice: Subject to any disclaimer, the term of this patent is extended or adjusted under 35 U.S.C. 154(b) by 0 days.

(21) Appl. No.: 09/235,551

(22) Filed: Jan. 22, 1999

Related U.S. Application Data
(60) Provisional application No. 60/072,152, filed on Jan. 22, 1998.

(51) Int. Cl.$^7$ ............................................. B60Q 1/26
(52) U.S. Cl. ..................... 362/494; 362/467; 362/488; 362/487; 362/512
(58) Field of Search ................................. 362/494, 467, 362/488, 512, 516, 9, 420, 658

(56) References Cited

U.S. PATENT DOCUMENTS

| | | |
|---|---|---|
| 4,657,362 | 4/1987 | Suzuki . |
| 5,371,659 | 12/1994 | Pastrick et al. . |
| 5,497,305 | 3/1996 | Pastrick et al. . |
| 5,497,306 | 3/1996 | Pastrick et al. . |
| 5,669,699 | 9/1997 | Pastrick et al. . |
| 5,669,704 | 9/1997 | Pastrick et al. . |
| 5,669,705 | 9/1997 | Pastrick et al. . |
| 5,703,732 | * 12/1997 | Boddy et al. ..................... 359/841 |
| 5,823,654 | 10/1998 | Pastrick et al. . |
| 5,863,116 | 1/1999 | Pastrick et al. . |
| 5,879,074 | 3/1999 | Pastrick . |

FOREIGN PATENT DOCUMENTS

| | | |
|---|---|---|
| 36 14 882 | 11/1987 | (DE) . |
| 36 35 471 | 4/1988 | (DE) . |
| 2 155 876 | 10/1985 | (GB) . |
| 2275329 | * 1/1994 | (GB) ............................... B60Q/1/24 |
| 2 275 329 | 8/1994 | (GB) . |

* cited by examiner

Primary Examiner—Sandra O'Shea
Assistant Examiner—Bertrand Zeade
(74) Attorney, Agent, or Firm—Pillsbury Madison & Sutro LLP

(57) ABSTRACT

The present invention relates to an exterior vehicle mirror assembly. The mirror comprises a housing with an electrically powered adjusting mechanism mounted therein, and a support structure to be fixed to the vehicle exterior. The housing is pivotally mounted to the support structure and both the housing and support structure provide structure cooperating to define an indexing pivot assembly. The support structure has a wire receiving passage formed therein and the housing has a wire passage access opening. The access opening provides access to the passage to facilitate passing electroconductive wire though the passage so as to allow the adjusting mechanism to be connected to an electric power source and a control signal source within the vehicle. A lighting assembly is constructed and arranged to be mounted to the support structure so as to close the wire access opening after an installer has passed the wiring through the wire receiving passage. The lighting assembly has light emitting elements operable to emit light therefrom and to be operatively connected to the remote signal receiver of the vehicle such that operation of a remote transmitter will signal the receiver to cause the light emitting elements to emit light generally downwardly from the support structure towards the ground.

25 Claims, 4 Drawing Sheets

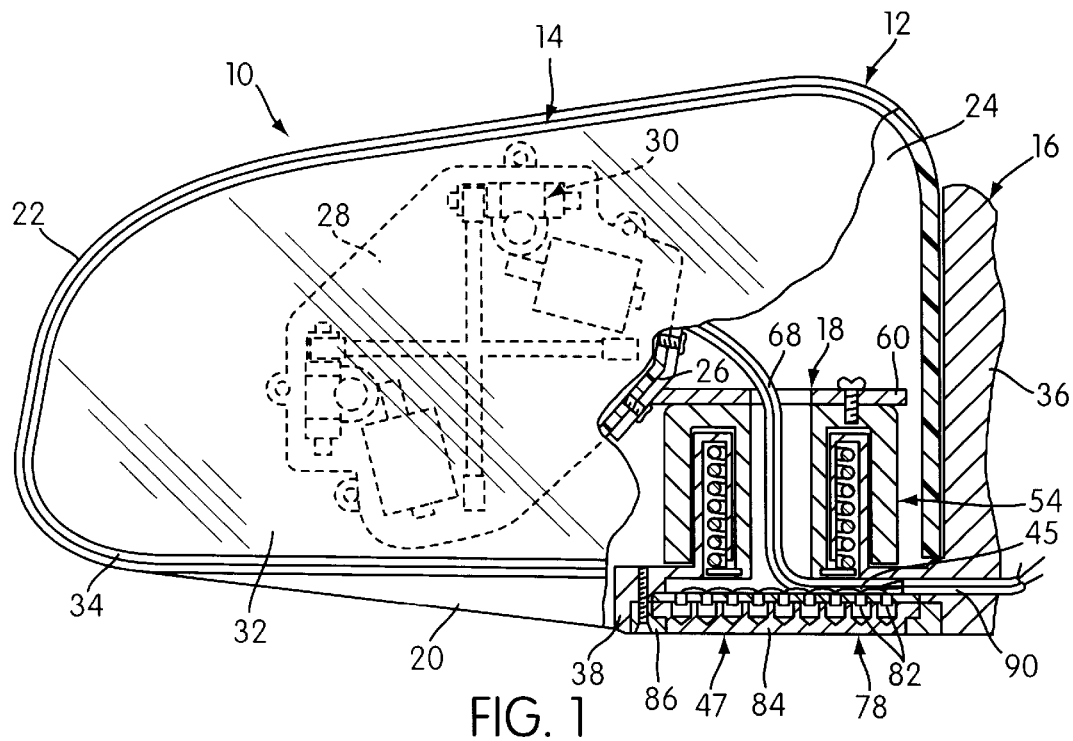

SINGLE PIVOT MIRROR WITH SECURITY LIGHT

This application claims the benefit of U.S. Provisional Application No. 60/072,152, filed Jan. 22, 1998.

FIELD OF THE INVENTION

The present invention relates to a mirror assembly with a light for installation on exterior of a motor vehicle.

BACKGROUND OF THE INVENTION

Various U.S. Patents have disclosed exterior vehicle mirror assemblies which incorporate a downwardly facing security light for providing a lighted area adjacent to the vehicle. The light is actuated by a remote transmitter that typically carried by the vehicle driver to remotely lock and unlock the doors and/or remotely start the engine. These lights are commonly called "puddle lamps" because light on the ground has the appearance of a puddle. Examples of such assemblies are shown in U.S. Pat. Nos. 5,823,654, 5,699,704, 5,669,699, 5,497,306, 5,497,305 and 5,371,659 and German Patent Appln. No. 3635471.

The problem with these known mirror assemblies and is that the light emitting components thereof are not readily adaptable for use in existing mirror assemblies. Specifically, the housing mirror assemblies disclosed in these patents are specially formed to accommodate the mounting of a light emitting component and have a larger forwardly facing profile than they would without the light emitting components. The larger profile results in increased wind resistance and require new toolings to form the housing because the light emitting components are not readily adaptable for existing mirror housings.

SUMMARY OF THE INVENTION

It is therefore an object of the present invention to provide a mirror assembly having a lighting assembly incorporated therein which is otherwise similar to like mirror assemblies without such a lighting assembly. To achieve this object, the present invention provides a mirror assembly for installation on the exterior of a motor vehicle. The mirror assembly comprises a mirror housing and an electrically powered mirror adjusting mechanism mounted within the interior of the housing. A support structure is constructed and arranged to be fixedly mounted to the motor vehicle exterior. The support structure has a wire receiving passage. The mirror housing is mounted to the support structure with one end of the wire receiving passage communicating with the interior of the mirror housing.

The support structure has a wire passage access opening providing access to the wire receiving passage for handling the wiring through the when the access opening is open. A lighting assembly is constructed and arranged to be mounted to the support structure so as to close the wire access opening The lighting assembly has light one or more emitting elements operable to emit light therefrom and to be operatively connected to the remote signal receiver of the vehicle such that, when the support structure is fixedly mounted to the vehicle exterior, operation of the remote transmitter will signal the remote receiver to cause the light emitting elements to emit light towards the ground from the support structure towards the ground so as to provide a lighted zone.

The mirror assembly of the present invention provides the advantages of incorporating a lighting assembly into an existing mirror assembly. In particular, the lighting assembly can be provided without changing the construction of either the support structure or the housing of an existing mirror assembly, thus saving the costs of providing new tooling for mirror assembly components which will accommodate a lighting assembly, such as those in the prior art.

Other objects, features, and advantages of the present invention will become apparent from the foregoing detailed description, the accompanying drawings, and the appended claims.

BRIEF DESCRIPTION OF THE DRAWINGS

FIG. 1 is an elevational view of a vehicle mirror assembly embodying the principles of the present invention as viewed by looking forwardly at the left-hand side of the vehicle with the mirror assembly in its operative position, the mirror assembly being shown partly in section for purposes of clearer illustration;

FIG. 2 is a schematic view illustrating the electrical circuit for turning the mirror light on and moving the mirror;

DETAILED DESCRIPTION OF THE PREFERRED EMBODIMENT OF THE INVENTION

Figure 3:
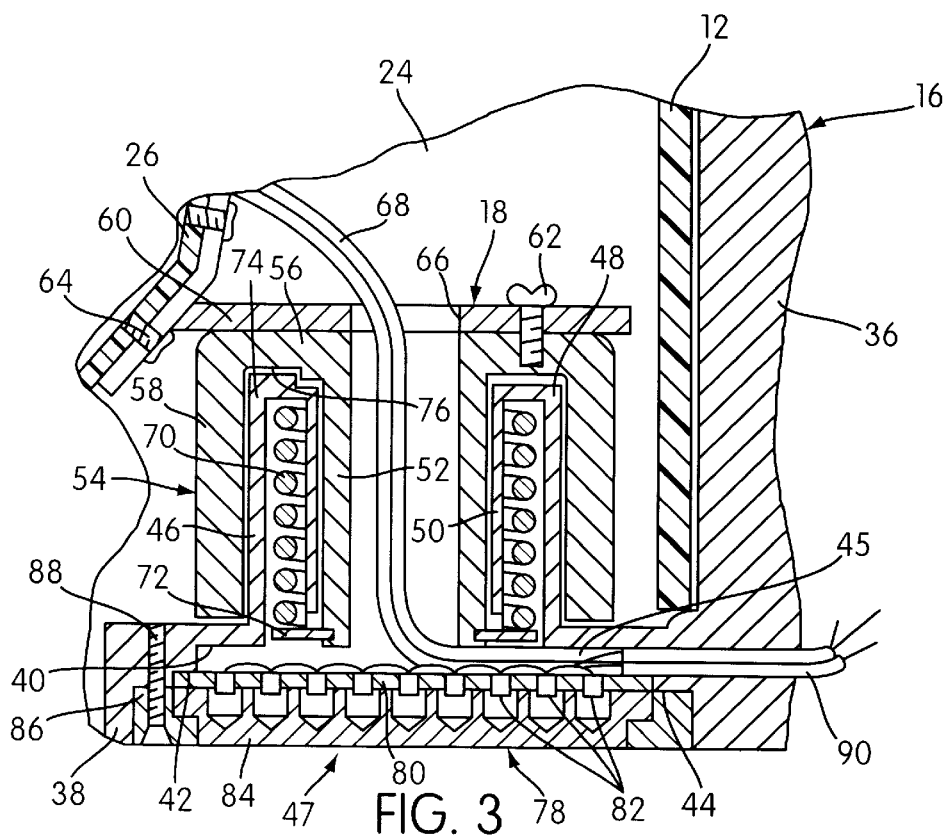
FIG. 3 is an enlarged cross-sectional view of the material shown in FIG. 1 in cross-section, with LEDs as the light emitting elements.
Figure 4:
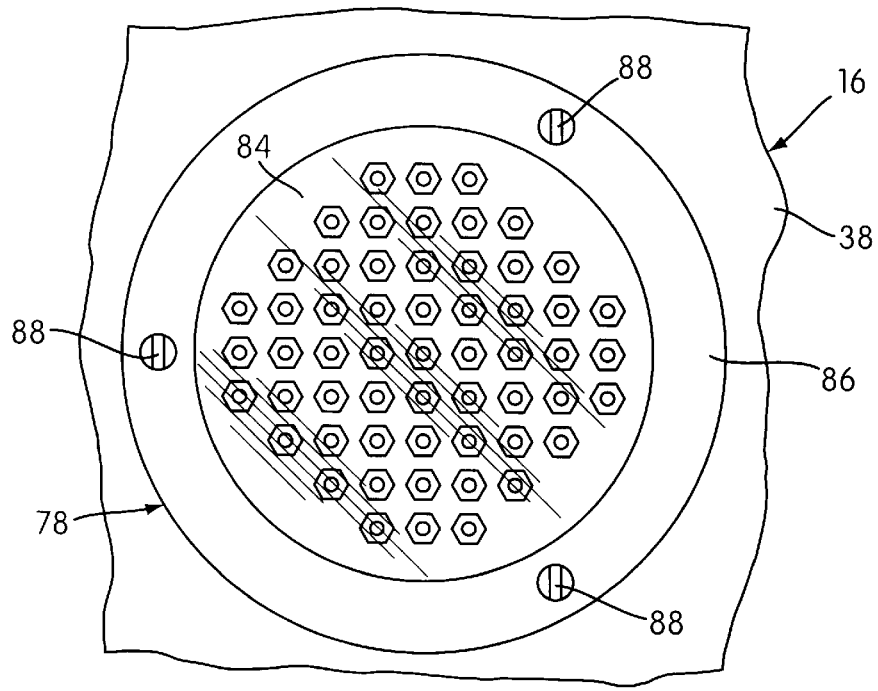
FIG. 4 is a fragmentary bottom plan view of the structure shown in FIG. 3.

FIG. 1 shows a vehicle mirror assembly, generally indicated at 10, which embodies the principles of the present invention. The vehicle mirror assembly 10 includes, in general, a molded plastic housing, generally indicated at 12, a mirror unit, generally indicated at 14 and mounted on the housing 12, and a support structure, generally indicated at 16. The support structure 16 is constructed and arranged to be fixedly mounted on a vehicle exterior, and specifically a front door thereof, so that the mirror unit 14 serves as a rear view mirror for the driver of the vehicle. A spring-biased indexing pivot assembly, generally indicated at 18, is defined between the support structure 16 and the housing 12 and is constructed and arranged to enable the housing 12 to be pivoted with respect to the support structure about an upright axis from an operative position thereof in either direction in response to an unwanted impact blow applied in either direction thereto.

The construction of the housing 12 is dependent upon whether the mirror assembly 10 is to be attached to a passenger car type automotive vehicle or other type of automotive vehicle, such as a truck or the like. In the passenger car exemplary embodiment shown, the housing 12 includes a molded plastic shell structure 20 providing a rearwardly disposed periphery 22 extending in surrounding relation to the mirror unit 14 and a front wall 24 which bulges forwardly in covering relation to the mirror unit 14.

The housing 12, as shown, also includes a fixed casing member 26 which is fixed to the central portion of the front housing wall 24 or it may be molded as an integral part thereof. The fixed casing member 26 is constructed and arranged to mate with a cooperating casing member 28 which is detachably fixed thereto. Carried by and within the casing members 26 and 28 is a power-operated adjusting mechanism, generally indicated at 30, which extends from the casing member 28 to the mirror unit 14. The adjusting mechanism 30 is constructed and arranged to move the mirror unit 14 into any one of a multiplicity of adjusted positions with respect to the housing 12. As shown, the adjusting mechanism 30 is constructed in accordance with the principles enunciated in commonly assigned U.S. Pat. No. 5,467,230, the disclosure of which is hereby incorporated by reference into the present specification. It will be understood that other known power-operated mechanisms may be utilized, as, for example, the more conventional mechanism as disclosed in U.S. Pat. No. 4,915,493, the disclosure of which is hereby incorporated by reference into the present specification.

In the embodiment shown, the mirror unit 14 consists of a mirror 32 and a mirror holder 34 the forward portion of which includes mounting elements for the adjusting mechanism 30.

In the preferred embodiment shown, the support structure 16 comprises a rigid structure including a door-mounting portion 36 which is suitably fixed to the vehicle front door. If desired, the door-mounting portion 36 can be covered by a cover member (not shown) in accordance with the teachings of commonly assigned U.S. Pat. No. 5,477,391, the disclosure of which is hereby incorporated by reference into the present specification.

The rigid support structure 16 also includes a housing support portion 38 which extends laterally outwardly from the door-mounting portion 36. The housing support portion 38 is formed with a downwardly facing generally circular recess 40 in its lower section. The peripheral wall of the housing support portion 38 which defines the periphery of the recess 40 is formed with an intermediate shoulder 42 and a lower shoulder 44. The support structure 16 further includes a wire receiving passage 45 extending through the door mounting portion 36 and into the housing support portion 38. The door mounting portion 36 has an opening (not shown) which allows wiring to be extended between the vehicle body interior and the wire receiving passage 45. As can be seen from the Figures, the wire receiving passage 45 communicates with the housing 12 interior. The circular recess 40 defines a wire passage access opening 47 which provides access to the wire receiving passage 45.

The housing support portion 38 also includes an integral upstanding outer cylindrical portion 46, an annular flange portion 48 extending inwardly from the upper edge of the outer cylindrical portion 46, and an inner cylindrical portion 50 extending downwardly from the inner edge of the flange portion 48. The outer and inner cylindrical portions 46 and 50 and the connecting flange 48 constitute a part of the spring-biased indexing pivot assembly 18 of the present subject matter.

Mounted within the central opening defined by the inner cylindrical portion 50 which communicates with the access opening is a cylindrical core portion 52 of a mounting member, generally indicated at 54, which forms a part of the spring-biased indexing pivot assembly 18. The mounting member 54 includes an integral annular flange portion 56 extending radially outwardly from the upper end of the cylindrical core portion 52 and an integral outer cylindrical portion 58 extending downwardly from the outer end of the flange portion 56. The mounting member 54 is, in turn, connected with the housing 12 through a bracket 60 which is suitably fixed both to the mounting member 54, as by bolts 62 or the like, and to the fixed casing member 26, as by bolts 64 or the like. The bracket 60 includes an opening 66 which communicates with the opening defined by the core portion 52 of the mounting member 54 and the wire receiving passage 45 to enable an electric wire 68 to be extended to or from the power-operated adjusting mechanism 30 to supply electrical power and control signals to affect the movement of the mirror unit 14.

A coil spring 70 mounted within the annular space between the outer and inner cylindrical portions 46 and 50 of the rigid support structure 16. The upper end of the coil spring 70 engages the flange portion 48 and the lower end engages a generally radially extending flange portion in the form of an expandable C-washer 72 mounted within an annular groove in the lower periphery of the core portion 52.

The coil spring 70 functions to bias the flange portion 56 of the mounting member 54 into engagement with the flange portion 48 of the rigid support structure 16. The C-washer 72 is spaced below the lower edge of the inner cylindrical portion 50 of the rigid support structure 16 so as to allow the mounting member 54 and housing 12 fixed thereto to be moved upwardly against the spring bias a limited amount. This limited amount of movement is provided to accommodate the indexing function of the pivot assembly 18.

Figure 5:
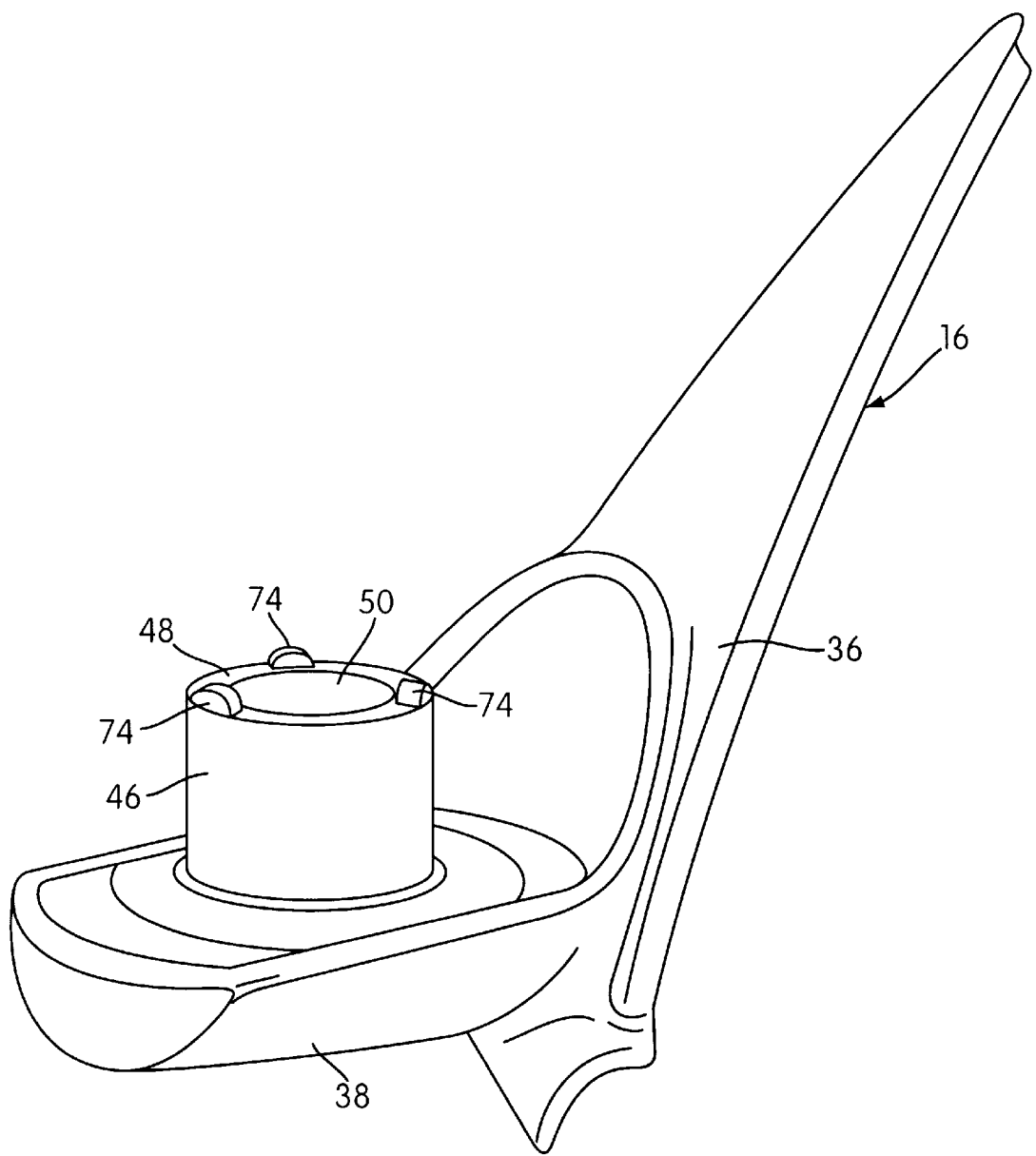
FIG. 5 is a perspective view of the support structure of the mirror assembly shown in FIG. 1.

As best shown in FIG. 5, the indexing function is accomplished by three annularly spaced raised indexing projections 74 having ramped opposite ends formed on the upper surface of the flange portion 48 of the rigid support structure 18 and a series of cooperating recesses 76 formed in the lower surface of the flange portion 56 of the mounting member 54. The three projections 74 seat within cooperating recesses 76 when the mounting member 54 and housing 12 are in an operative position extending laterally outwardly from the door of the vehicle. The rotational mounting of the mounting member 54 on the outer and inner cylindrical portions 46 and 50 of the rigid support structure 16 enables the housing 12 to be manually moved about the axis provided by the outer and inner cylindrical portions 46 and 50 of the rigid support structure 16 in either direction away from the operative position thereof. However, the action of the spring 70 and the raised projections 74 within the recesses 76 provides a yielding resistance to such movement. After a small amount of movement, housing 12 is displaced upwardly and the upper surfaces of the projections 74 ride on the lower surface of the flange portion 56 between the recesses 76. The spring 70 applies a biasing force to yieldingly resist this upward movement. This yielding movement in either direction will occur when unwanted impact blows of a sufficient magnitude in either direction are delivered to the housing 12. Such yielding movement prevents damage which would otherwise occur if unwanted impact blows were delivered to the housing without the yielding movement capability.

If desired, the recesses 76 can be positioned to index the housing in a folded back position.

In a broad sense, the raised projections 74 and the recessed surfaces 76 may be considered cooperating structures which are normally engaged with one another to yieldingly maintain the housing 12 in a fixed angular position. When an impact force of sufficient magnitude is applied to the housing 12, the cooperating structures will yieldingly move and disengage from one another to allow the housing 12 to pivot in the direction of the force. Other arrangements may be used to provide this indexed pivoting effect. Further, a powered indexing an control system, such as the one disclosed in commonly owned U.S. Pat. No. 5,703,732, the entirety of which is hereby incorporated into the present application by reference, may be used. When a power-operated system is used, the wiring therefor may be passed through wire receiving passage 45 to the vehicle power source.

In accordance with the principles of the present invention, a light assembly, generally indicated at 78, is mounted within the recess 40. The light assembly 78 includes a circuit board 80 on which is mounted an array of light emitting elements in the form of light-emitting diodes (LEDs) 82. As shown, the circuit board 80 is mounted within the recess 40 in engagement with the intermediate shoulder 42 and a lens structure 84 is mounted below the circuit board 80 in cooperation with the downwardly extending LEDs 82 mounted thereon. The lens structure 84 and circuit board 80 are detachably mounted within the recess 40 by a suitable rim 86 which is suitably fixed to the rigid support structure 18 as by bolts 88 or the like. The rim 86 can be snap-fitted or secured in any other well-known fashion to the rigid structure portion 38.

A number of electrical wires 90 for energizing and controlling the light assembly 78, like the electrical wires 68, extend through the wire receiving passageway 45 in the rigid support structure 18.

The light assembly 78, when turned on, provides a security light for an operator of the vehicle which light shines downwardly from the mirror assembly 10 to provide a lighted security zone surrounding the lower end of the driver's door of the vehicle. The light thus provides an assist for the operator in entering the vehicle from the exterior thereof. To facilitate the turning on of the light assembly 78 from the exterior of the vehicle, the present invention contemplates the use of a portable battery-operated radio frequency transmitter 94 of the type that are presently provided as part of the key assembly to vehicle car owners. The conventional transmitter 94, when actuated, transmits a radio signal which is received by a receiver 96 within the vehicle which is connected in the vehicle battery circuit. The vehicle battery circuit in which the receiver is connected can control the interior lights and power locks for the doors as well as other instrumentalities which are well known. In accordance with the present invention, the signal from the RF receiver is connected to the circuit board 80 to energize the LED's 82 and produce a light which shines downwardly through the lens structure 84. As previously indicated, the mirror control wires can be associated with the control wires for the light assembly so as to extend through the door and the door mounting portion 36 of the mirror assembly 10 to the light assembly 78 and power-operated adjusting mechanism 30. It will be understood that the de-energizing of the light assembly 78 can be controlled from the circuit within the vehicle. The details of an exemplary circuit can be secured by reviewing the disclosure of U.S. Pat. No. 5,371,659, the disclosure of which is hereby incorporated by reference into the present specification.

Figure 6:
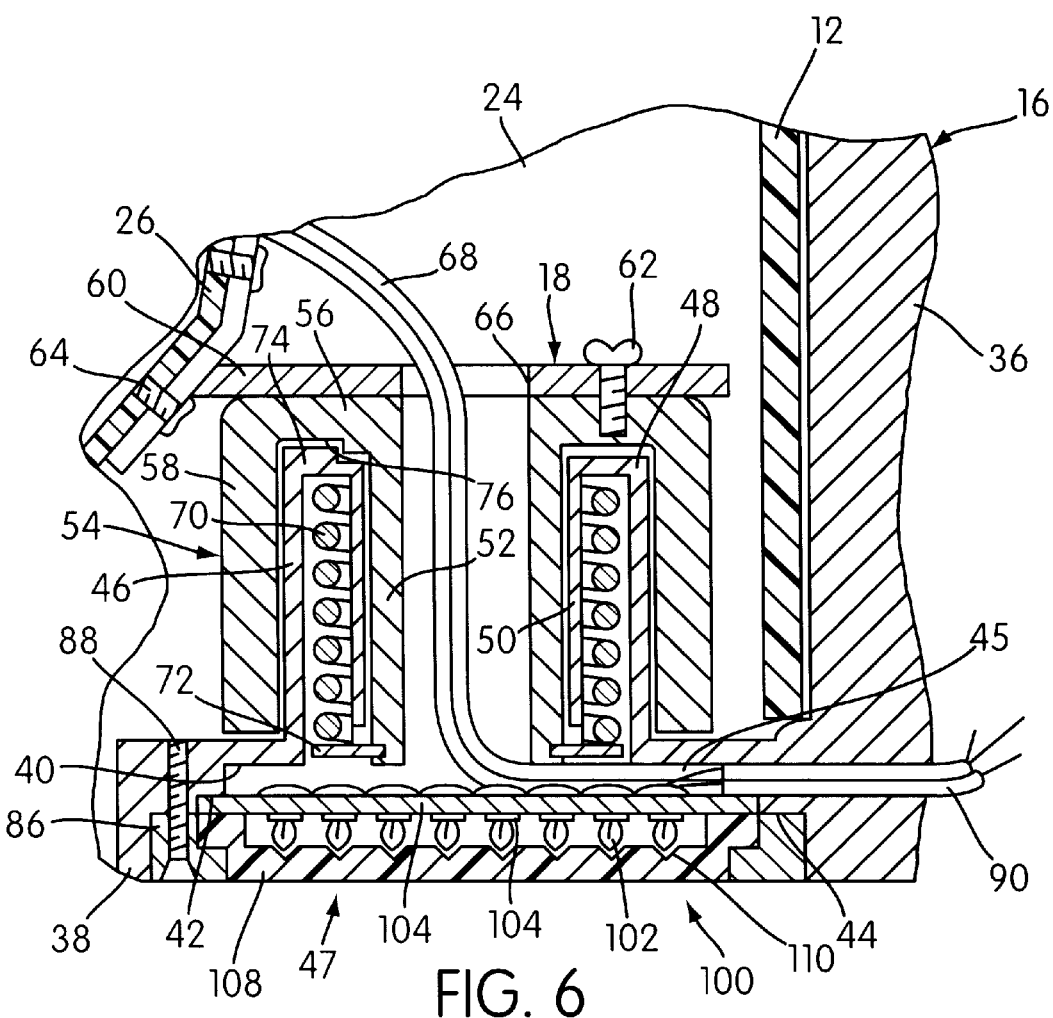
FIG. 6 is an enlarged cross-sectional view similar to FIG. 3, with incandescent bulbs as the light emitting elements.

FIG. 6 shows an alternative embodiment of the present invention. Because many of the structural components are the same between this alternative embodiment and the previous embodiment, the same reference numerals will denote substantially identical structures and components.

The main difference between the embodiment of FIG. 6 and the previous embodiment is that the lighting assembly 100 of the alternative embodiment utilizes a plurality of common incandescent bulbs 102 in place of LEDs 82. The circuit board 104 has sockets 106 for mounting the bulbs 102. The bulbs 102 can be either threadingly engaged or soldered to the sockets 104. A thin lens structure 108 is mounted in place and has a plurality of indentations 110 for receiving the ends of the bulbs 102. The positioning of the bulb ends within the indentations helps reduce the overall thickness of the lighting assembly 100.

Incandescent bulbs 102 are common bulbs similar to those found in flashlights. The use of incandescent bulbs 102 is preferred over LEDs 82 because incandescent bulbs 102 can be purchased at a fraction of the cost of LEDs. Thus, the use of incandescent bulbs 102 helps keep the overall cost of the mirror 10 assembly down.

A significant advantage of the present subject matter resides in the construction of the light assembly 78, 100 and its mounting within the mirror assembly 10. By utilizing a circuit board 80, 104 with an array of light emitting elements and a relatively thin cooperating lens structure 84, it becomes possible to essentially provide the light assembly 78 within the confines of the support structures heretofore provided without a light assembly. Single pivot mirror assemblies of the type herein described have been provided without embodying a light assembly in much the same construction as that presently described where the opening 47 is provided for facilitating connecting the wiring to and from the adjusting mechanism for moving the mirror unit and is covered by a snap-in cover. To provide the light function without substantially changing the configuration of the mirror assembly 10 is a highly desirable function because of the wind resistance that would be added if an increase in the overall periphery of the mirror assembly 10 were to be required.

It can thus be seen that the objects of the present invention have been fully and effectively accomplished. It will be understood that the foregoing preferred embodiments have been provided to illustrate the functional and structural principles of the present invention and are not intended to be limiting. To the contrary, the present invention is intended to encompass all modifications, substitution, and alternations within the spirit and scope of the appended claims.

It should be noted that the appended claims have not been phrased in the "means or step for performing a specified function" permitted by 35 U.S.C. § 112, ¶6. This is to point out that the claims are not intended to be interpreted under § 112,¶6 as being limited solely to the structures, material or acts described hereinabove or their equivalents.

Any U.S. patents or patent applications mentioned hereinabove and not specifically incorporated by reference are now hereby incorporated into the present application by reference.

What is claimed is:

1. A mirror assembly for installation on the exterior of a motor vehicle proximate a driver or passenger door thereof, the motor vehicle having a remote signal receiver to be used in conjunction with a remote transmitter carried by a vehicle operator, said assembly comprising:

a mirror housing;

an electrically powered mirror adjusting mechanism mounted within an interior of said housing;

a support structure having a wire receiving passage, said support structure being constructed and arranged to be fixedly mounted to the motor vehicle exterior proximate either of the driver or passenger;

said mirror housing being mounted to said support structure with one end of said wire receiving passage communicating with the interior of said mirror housing;

electroconductive wiring passed through said wire receiving passage and operatively connected to said adjusting mechanism in the interior of said mirror housing for operative connection to an electric power supply source of the vehicle;

said support structure having a wire passage access opening providing access to said wire receiving passage for handling of said wiring when said access opening is open;

a reflective mirror positioned to face generally rearwardly with respect to the vehicle so as to reflect objects located rearwardly of the vehicle into the passenger compartment of the vehicle when said support structure is fixedly mounted to the vehicle exterior, said adjusting mechanism being constructed and arranged to selectively position said mirror relative to said housing; and a lighting assembly constructed and arranged to be mounted to said support structure so as to close said wire access opening said lighting assembly having one or more light emitting elements operable to emit light therefrom and to be operatively connected to the remote signal receiver of the vehicle when said support structure is fixedly mounted to the vehicle exterior such that operation of the remote transmitter will signal the remote receiver to cause said one or more light emitting elements to emit light from said support structure so as to provide a lighted zone.

2. A mirror assembly according to claim 1, wherein said housing is pivotally mounted on said support structure for pivotal movement about a generally vertically extending pivot axis.

3. A mirror assembly according to claim 2, wherein said housing and said mirror assembly cooperate to provide an indexing pivot assembly, said indexing pivot assembly providing cooperating structures engaged with one another to yieldably maintain said housing in a fixed angular position with respect to said pivot axis in the absence of an impact force of a sufficient magnitude being applied to said housing, said cooperating structures being constructed and arranged to yieldingly move and disengage from one another as a result of the impact force of sufficient magnitude being applied to said housing so as to allow said housing to pivot in the direction of the applied impact force.

4. A mirror assembly according to claim 3, wherein said cooperating structures of said indexing pivot assembly comprise a plurality of raised projections and a plurality of recessed surfaces, and wherein said indexing pivot assembly further comprises a biasing element engaging surface provided on said support structure and a biasing element engaging surface provided on said housing;

said indexing pivot assembly further comprising a yieldingly deformable biasing element positioned between said engaging surfaces, said biasing element being constructed and arranged to apply a biasing force to said engaging surfaces to yieldingly maintain said raised projections engaged with said recessed surfaces, said biasing element being constructed and arranged to yieldingly deform so as to allow said raised projections to disengage from said recessed surfaces when the aforesaid sufficient impact force is applied to said housing;

said access opening being positioned and configured to facilitate positioning of said biasing element between the engaging surface of said support structure and the engaging surface of said housing.

5. A mirror assembly according to claim 4, wherein said indexing pivot assembly further comprises a cylindrical portion provided on said support structure and a cylindrical portion provided on said housing, said cylindrical portions being arranged concentrically one within the other with an inner one of said cylindrical portions providing a central opening extending along said pivot axis, said central opening establishing communication between the interior of said mirror housing and said wire receiving passage to allow said wiring to pass from said passage to the interior of said housing;

each of said cylindrical portions having a flange extending radially therefrom, said flanges providing said engaging surfaces of said housing and said support structure.

6. A mirror assembly according to claim 5, wherein said access opening is aligned with said central opening.

7. A mirror assembly according to claim 6, wherein said biasing element is a coil spring.

8. A mirror assembly according to claim 3, wherein said cooperating structures of said indexing pivot assembly comprise a plurality of raised projections provided on said support structure and a plurality of recessed surfaces provided on said housing.

9. A mirror assembly according to claim 8, wherein said indexing pivot assembly comprises an inner cylindrical portion provided on said support structure and an inner cylindrical portion provided on said housing;

said inner cylindrical portion of said support structure having a flange portion extending generally radially outwardly therefrom, said raised projections being provided on said flange portion;

said inner cylindrical portion of said housing being received within said inner cylindrical portion of said base structure and having a flange portion extending generally radially outwardly therefrom;

said indexing pivot assembly further comprising a yieldingly deformable spring engaged with both said generally radially extending flange portion and constructed and arranged to apply a biasing force to yieldingly maintain said raised projections engaged with said recessed surfaces, said spring being constructed and arranged to yieldingly deform so as to allow said raised projections to be disengaged from said recessed surfaces when the sufficient impact force is applied to the housing.

10. A mirror assembly according to claim 3, wherein said inner cylindrical portion of said housing has a central opening formed therethrough, said central opening being open to said wire receiving passage such that said central opening communicates said wire receiving passage with the housing interior and the wiring passes through said central opening, said wire access opening of said support structure being vertically aligned with said central opening to (a) facilitate passing said wire through both said wire receiving passage and said central opening and (b) facilitate engagement of said spring with said flange portions.

11. A mirror assembly according to claim 10, wherein said inner cylindrical portion of said housing has another flange portion extending generally radially outwardly therefrom, said recessed surfaces being provided on said another flange portion.

12. A mirror assembly according to claim 11, wherein said housing has an outer cylindrical portion formed integrally with said another flange portion thereof and spaced radially outwardly from said inner cylindrical portion thereof;

said support structure having an outer cylindrical portion formed integrally with said flange portion thereof and spaced radially outwardly from said inner cylindrical portion thereof;

said spring being received between the inner and outer cylindrical portions of said support structure;

said inner and outer cylindrical portions and said flange portion of said support structure being received between the inner and outer cylindrical portions of said housing.

13. A mirror assembly according to claim 12, wherein said flange portion of said inner cylindrical portion said housing is an expandable washer.

14. A assembly according to claim 1, wherein said light assembly comprises a circuit board and a lens, said one or more light emitting elements being mounted to said circuit board.

15. A single pivot mirror assembly according to claim 14, further comprising additional electroconductive wiring adapted to be connected between said lighting assembly and the electrical power source of the vehicle, said additional wiring extending through said wire receiving passage between said lighting assembly and the electrical power source when said support structure is fixedly mounted to the vehicle exterior.

16. A single pivot mirror assembly according to claim 14, wherein said light emitting elements are incandescent bulbs.

17. A single pivot mirror assembly according to claim 14, wherein said light emitting elements are light emitting diodes.

18. A single pivot mirror assembly for installation on the exterior of a motor vehicle proximate a driver or passenger door thereof, the motor vehicle having a remote signal receiver to be used in conjunction with a remote transmitter carried by a vehicle operator, said assembly comprising:

a support structure constructed and arranged to be fixedly mounted to the motor vehicle exterior proximate either of the driver or passenger door;

a mirror housing;

said mirror housing and said support structure having pivotal mounting structures coupled together to pivotally mount said housing to said support structure for pivotal movement about a generally vertically extending pivot axis;

a reflective mirror positioned to face generally rearwardly with respect to the vehicle so as to reflect objects located rearwardly of the vehicle into the passenger compartment of the vehicle when said support structure is fixedly mounted to the vehicle exterior;

said support structure having an access opening when said support structure is mounted to the vehicle exterior, said access opening when open providing access to the coupled pivotal mounting structures of said housing and said support structure;

a lighting assembly constructed and arranged to be mounted to said support structure so as to close said access opening, said lighting assembly having one or more light emitting elements operable to emit light therefrom and to be operatively connected to the remote signal receiver of the vehicle when said support structure is fixedly mounted to the vehicle exterior such that operation of the remote transmitter will signal the remote receiver to cause said one or more light emitting elements to emit light from said support structure so as to provide a lighted zone.

19. A single pivot mirror assembly according to claim 18, wherein said pivotal mounting structures of said housing and said support structure are engaged with one another to (a) yieldably maintain said housing in a fixed angular position with respect to said pivot axis in the absence of an impact force of a sufficient magnitude being applied to said housing and (b) to allow said housing to pivot about said pivot axis relative to said housing as a result of said impact force of sufficient magnitude being applied to said housing.

20. A single pivot mirror assembly according to claim 19, further comprising a biasing element biasing said pivotal mounting structures into engagement with one another to yieldably maintain said housing in the fixed angular position as aforesaid.

21. A single pivot mirror assembly according to claim 20, wherein said pivotal mounting structures said housing and said support structure include plurality of raised projections and a plurality of recessed surfaces, said biasing element urging said raised projections into engagement with said recessed surfaces and being yieldingly deformable so as to allow said raised projections to disengage from said recessed surfaces when the aforesaid sufficient impact force is applied to said housing.

22. A single pivot mirror assembly according to claim 18, wherein said biasing element is a coil spring.

23. A single pivot mirror assembly according to claim 18, further comprising an electrically powered mirror adjusting mechanism mounted within an interior of said housing, said adjusting mechanism being constructed and arranged to selectively position said mirror relative to said housing;

said support structure having a wire receiving passage with one end of said wire receiving passage communicating with the interior of said housing, said wire receiving passage having another end that communicates with the vehicle when said support structure is fixedly mounted to the exterior thereof;

electroconductive wiring passed through said wire receiving passage and operatively connected to said adjusting mechanism in the interior of said mirror housing for operative connection to an electric power supply source of the vehicle;

said access opening providing access to said wire receiving passage for handling of said wiring when said access opening is open.

24. A single pivot mirror assembly according to claim 21, wherein said pivotal mounting structure of said support structure comprises a cylindrical portion provided on said support structure and wherein said pivotal mounting structure of said housing comprises a cylindrical portion provided on said housing;

each of said cylindrical portions having a flange extending radially therefrom, said flanges providing said engaging surfaces of said housing and said support structure.

25. A single pivot mirror assembly according to claim 24, wherein said access opening is aligned with said central opening.

* * * * *